(12) United States Patent
Kapcar et al.

(10) Patent No.: US 12,112,126 B2
(45) Date of Patent: *Oct. 8, 2024

(54) RECOMMENDATION PLATFORM FOR SKILL DEVELOPMENT

(71) Applicant: TrueBlue, Inc., Tacoma, WA (US)

(72) Inventors: Christopher A. Kapcar, Hinsdale, IL (US); Richard Paul Betori, Gurnee, IL (US); Jeffrey Howard Rash, Naperville, IL (US); Robert Michael Ward, Issaquah, WA (US); Jeffrey S. Dirks, Kirkland, WA (US); Jeroen Anton Decker, Ravensdale, WA (US); Shawn David Dillenbeck, Bartlett, IL (US)

(73) Assignee: TRUEBLUE, INC., Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,778

(22) Filed: Sep. 6, 2023

(65) Prior Publication Data

US 2024/0012991 A1 Jan. 11, 2024

Related U.S. Application Data

(63) Continuation of application No. 17/191,047, filed on Mar. 3, 2021, now Pat. No. 11,790,163, which is a
(Continued)

(51) Int. Cl.
*G06F 40/186* (2020.01)
*G06F 40/174* (2020.01)
*G06N 20/00* (2019.01)

(52) U.S. Cl.
CPC .......... *G06F 40/186* (2020.01); *G06F 40/174* (2020.01); *G06N 20/00* (2019.01)

(58) Field of Classification Search
CPC ...... G06F 40/186; G06F 40/174; G06N 20/00
See application file for complete search history.

(56) References Cited

U.S. PATENT DOCUMENTS 10,388,176 B2 8/2019 Wallace et al.
10,699,226 B1 6/2020 Lyons et al.
(Continued)

OTHER PUBLICATIONS

Advisory Action mailed Oct. 18, 2022 in U.S. Appl. No. 17/191,076.
(Continued)

*Primary Examiner* — Kyle R Stork
(74) *Attorney, Agent, or Firm* — Perkins Coie LLP

(57) ABSTRACT

Disclosed is a platform that manages worker users in a temporary staffing environment via an artificial machine learning model. The temporary staffing platform matches available workers to available shifts/gigs. Additional features include generating provisional or near-miss matches and informing workers how to turn those near-misses into full matches, plotting a gig-career path to develop additional skills, gamify development, and automatically generate resumes. The platform generates a set of skill tags associated with each shift/gig performed by the user. Designing of resume text files by the artificial machine learning model includes procedurally generated descriptions of experience the a user has based on the recording of each shift/gig performed by the user and the skill tags associated with each recorded shift/gig, wherein a format of the resume text file is formulated by the artificial machine learning model evaluating a mix of skill tags and employers amassed by the user.

20 Claims, 10 Drawing Sheets

Related U.S. Application Data continuation of application No. 17/159,015, filed on Jan. 26, 2021, now Pat. No. 11,822,881.

(60) Provisional application No. 63/017,243, filed on Apr. 29, 2020.

(56) References Cited

U.S. PATENT DOCUMENTS

| | | | |
|---|---|---|---|
| 10,970,480 | B1 | 4/2021 | Slosar et al. |
| 10,984,361 | B1 | 4/2021 | Shook et al. |
| 11,822,881 | B1 | 11/2023 | Kapcar et al. |
| 2005/0033633 | A1 | 2/2005 | Lapasta et al. |
| 2006/0229896 | A1 | 10/2006 | Rosen et al. |
| 2016/0104096 | A1 | 4/2016 | Ovick et al. |
| 2017/0300867 | A1 | 10/2017 | Mgeant et al. |
| 2018/0308062 | A1 | 10/2018 | Quitmeyer |
| 2019/0089701 | A1 | 3/2019 | Mercury et al. |
| 2019/0220824 | A1 | 7/2019 | Liu |
| 2019/0340951 | A1 | 11/2019 | Clarno |
| 2020/0111044 | A1 | 4/2020 | New et al. |
| 2020/0118056 | A1 | 4/2020 | Leslie |
| 2020/0311687 | A1 | 10/2020 | Leslie |
| 2020/0387819 | A1 | 12/2020 | Rogynskyy et al. |
| 2021/0027252 | A1 | 1/2021 | Leslie |
| 2021/0335147 | A1 | 10/2021 | Johnson et al. |
| 2022/0180323 | A1 | 6/2022 | Di Sipio et al. |

OTHER PUBLICATIONS

Advisory Action mailed Oct. 3, 2022 in U.S. Appl. No. 17/191,047.
Advisory Action mailed Sep. 30, 2022 in U.S. Appl. No. 17/159,015.
Final Action mailed Aug. 4, 2023 in U.S. Appl. No. 17/191,076.
Final Action mailed Jul. 15, 2022 in U.S. Appl. No. 17/159,015.
Final Office Action mailed Jul. 19, 2022 in U.S. Appl. No. 17/191,047.
Final Office Action mailed Jul. 27, 2022 in U.S. Appl. No. 17/191,076.
First Office Action mailed Feb. 17, 2022 in U.S. Appl. No. 17/191,076.
Non-final Office Action mailed Feb. 15, 2022 in U.S. Appl. No. 17/159,015.
Non-final Office Action mailed Feb. 8, 2023 in U.S. Appl. No. 17/159,015.
Non-final Office Action mailed Feb. 16, 2022 in U.S. Appl. No. 17/191,047.
Non-final Office Action mailed Mar. 10, 2023 in U.S. Appl. No. 17/191,047.
Non-final Office Action mailed Mar. 20, 2023 in U.S. Appl. No. 17/191,076.

RECOMMENDATION PLATFORM FOR SKILL DEVELOPMENT

CROSS-REFERENCE TO RELATED APPLICATIONS

This application is a continuation of U.S. patent application Ser. No. 17/191,047 filed Mar. 3, 2021, which is a continuation application of U.S. patent application Ser. No. 17/159,015, titled "RECOMMENDATION PLATFORM FOR SKILL DEVELOPMENT," filed Jan. 26, 2020, which claims priority to U.S. Provisional Application No. 63/017,243, titled "RECOMMENDATION PLATFORM FOR SKILL DEVELOPMENT," and filed Apr. 29, 2020; which is incorporated by reference hereto.

TECHNICAL FIELD

The disclosure relates to identification and allocation of skills. More particularly, the disclosure relates to management of qualifications in temporary staffing positions.

BACKGROUND

Traditionally, temporary employment staffing systems have included branch offices where potential workers arrive early in the morning and are directed to various available temporary staffing positions for the day (e.g., event and convention workers, construction, skilled laborers, one-time projects, etc.) based on their experience.

The above staffing model has evolved into a digital model that makes use of mobile applications to guide potential workers to available positions.

Additionally, when an employer wishes to identify potential employees for a job that needs to be filled, it is common that the employer will place a job advertisement with a job classified website or the like. However, the employer must then filter through the applications from potential employees which can be a tedious task. Another common technique is that the employer may engage a recruiter to identify potential employees. The more traditional staffing method requires significant investment, retaining workers for long-term positions, and does not enable quick scale-up or scale-down of work force.

DETAILED DESCRIPTION

Figure 1:
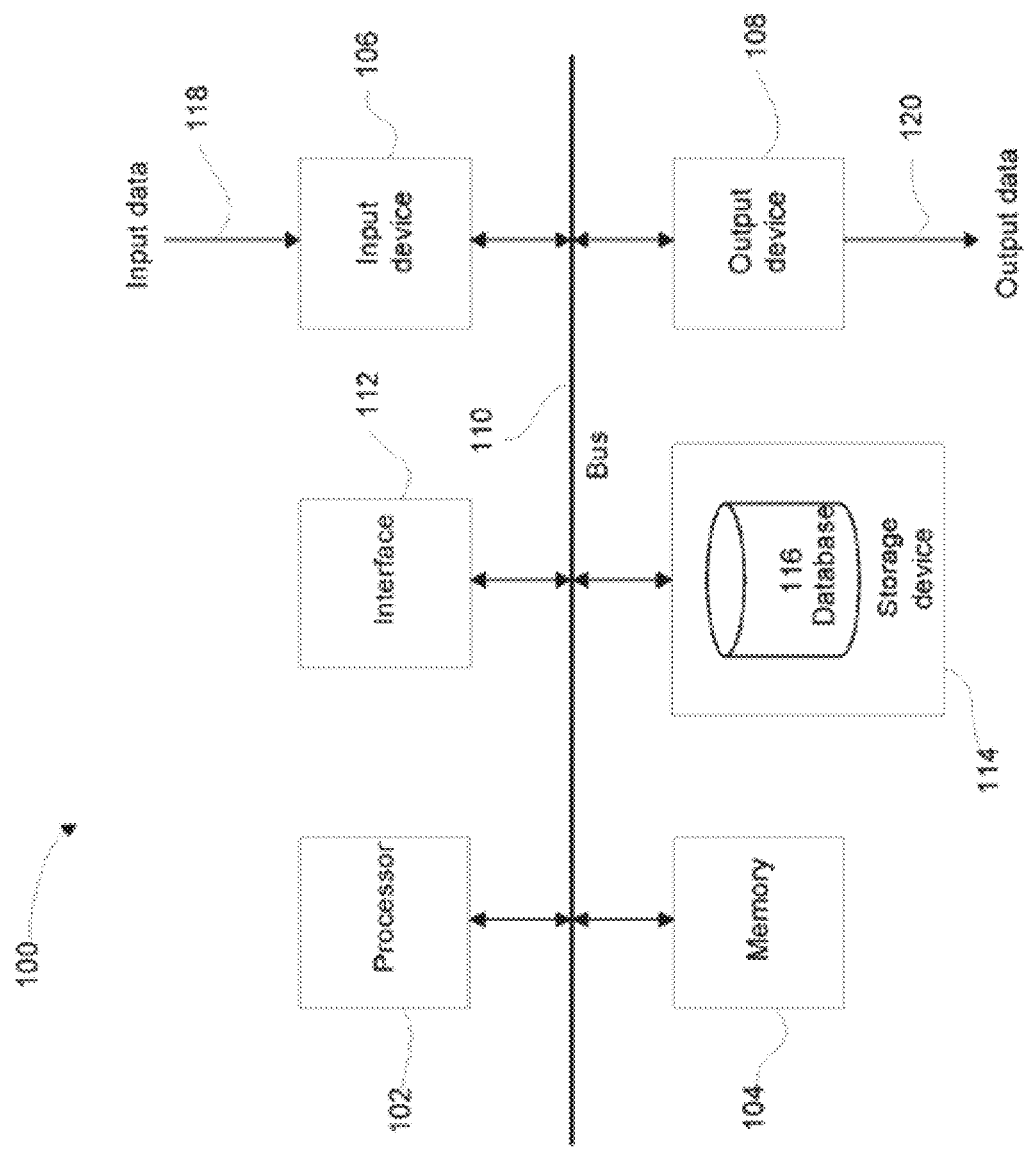
FIG. 1 is an example of a particular embodiment of the present invention can be realized using a processing device.

Short-term, temporary employment staffing platforms operate by linking a number of available workers to gigs (e.g., short-term, temporary employment). Available jobs are matched to workers and recommended thereto. The matching process is largely based on qualifications of the worker based on their previous work, certifications, review on previous gigs, and availability.

An example of a gig staffing platform makes use of a mobile device application where workers can browse their matches and sign up to work. Once the worker has chosen a job or gig and signs up, the worker shows up and works the gig. Because the positions are temporary (e.g., many lasting no more than a single shift), there does not tend to be any sort of extended evaluation or interview process. If a worker is qualified to sign up for the work, they may sign up and show up to the job. If the worker had worked for a given employer before, there may be a pre-existing evaluation on that worker (e.g., blacklisting or whitelisting the worker).

Once the worker performs the agreed upon work, an administrator at the gig employment reviews the worker and the worker repeats the process based on a new rating received from the gig administrator.

In many cases, the available jobs have requirements. The requirements vary from certifications, worker skills, worker previous experience, worker ratings, or other known suitable forms of temporary worker evaluations. If a worker does not fit the requirements, they will not be matched, and those jobs will not be available for a worker to browse.

In a system where workers are matched only to jobs where they fit the requirements, there is no encouragement for personal growth of the user base. It is often the case that jobs requiring more requirements or certifications pay better. Those users who use the system for extended or consistent periods, benefit if they improve the positions for which they may sign up.

Disclosed herein is a system to introduce provisional job matches to users of the temporary staffing platform, generate an automated resume for the user, and gamify platform participation. Provisional job matches are those jobs that would match but-for limited set of additional requirements not currently met by the worker.

In some embodiments, provisional job matches are a guided process that makes use of categorical skill sets that are shared between various types of employment. For example, if a worker has experience working with heavy machinery, provisional job matches for that worker may be directed to better positions that similarly are connected with machinery.

Workers are shown a map view of available and provisional jobs matched on percentage of compatibility characteristics between the workers' qualifications and preferences and the employers' service needs and preferences. Worker qualifications and preferences will include but not be limited to skills, industry, type of work, location, environment, assignment length, and/or potential earnings.

Associates will have the opportunity to earn badges through work quality and tenure that will allow them to see more highly valued jobs. The same factors used to show workers matching jobs are used on employer side to show matching associates.

In some embodiments, workers are provided with a path to improve their ratings, or to obtain skills they would need to match with higher quality temporary positions. The path to obtain additional skills may involve volunteer work to gain experience for the higher quality position or include directions toward obtaining necessary certifications (ex: a welding certification, a drug-free certification, or a class A driver's license).

Exemplary System Embodiment

FIG. 1 is an example of a particular embodiment of the present invention can be realized using a processing device. In particular, the processing device 100 generally includes at least one processor 102, or processing unit or plurality of processors, memory 104, at least one input device 106, and at least one output device 108, coupled together via a bus or group of buses 110. In certain embodiments, input device 106 and output device 108 could be the same device. An interface 112 can also be provided for coupling the processing device 100 to one or more peripheral devices, for example interface 112 could be a PCI card or PC card.

At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing device 100.

In alternative embodiments, the processing device 100 operates as a standalone device or may be connected (networked) to other machines. In a networked deployment, the machine may operate in the capacity of a server or a client machine in a client-server network environment, or as a peer machine in a peer-to-peer (or distributed) network environment.

Input device 106 receives input data 118 (such as electronic content data), for example via a network or from a local storage device. Output device 108 produces or generates output data 120 (such as viewable content) and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

Examples of electronic data storage devices 114 can include disk storage, optical discs, such as CD, DVD, Blu-ray Disc, flash memory/memory card (e.g., solid state semiconductor memory), MultiMedia Card. USB sticks or keys, flash drives. Secure Digital (SD) cards, microSD cards, miniSD cards, SDHC cards, miniSDSC cards, solid state drives, and the like.

In use, the processing device 100 is adapted to allow data or information to be stored in and/or retrieved from, via wired or wireless communication means, the at least one database 116. The interface 112 may allow wired and/or wireless communication between the processing unit 102 and peripheral components that may serve a specialized purpose. The processor 102 receives instructions as input data 118 via input device 106 and can display processed results or other output to a user by utilizing output device 108. More than one input device 106 and/or output device 108 can be provided. It should be appreciated that the processing device 100 may be any form of terminal. PC, laptop, notebook, tablet, smart phone, specialized hardware, or the like.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch, or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine-readable storage medium" shall also be taken to include any medium that is capable of storing, encoding, or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

Figure 2:
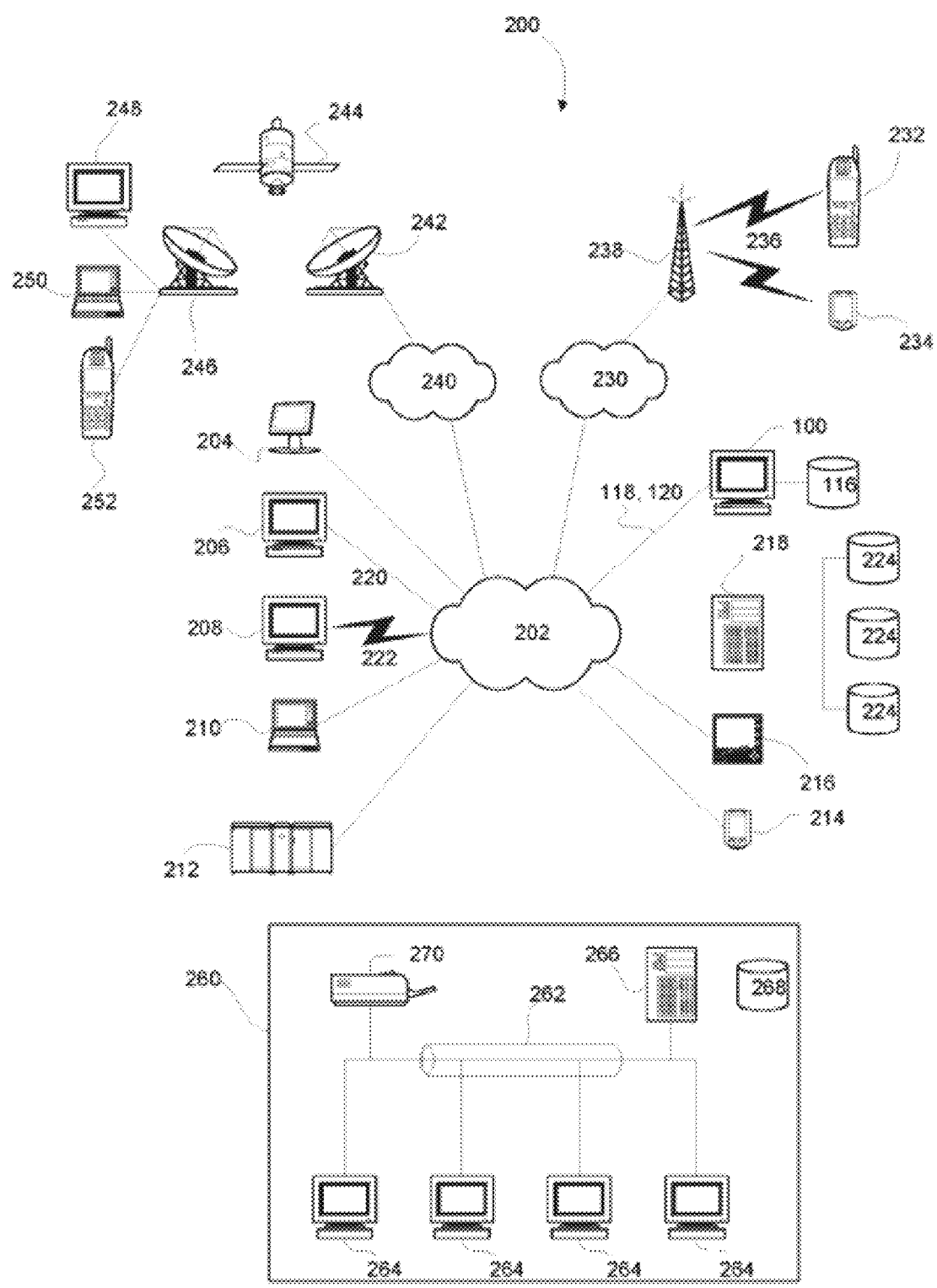
FIG. 2 illustrates a networked communications system that may include the processing device.

FIG. 2 illustrates a networked communications system 200 that may include the processing device 100. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilized. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilizing wireless communication means 236 and receiving/transmitting station 238. Mobile telephone 232 devices may load software (client) that communicates with a backend server 206, 212, 218 that operates a backend version of the software. The software client may also execute on other devices 204, 206, 208, and 210. Client users may come in multiple user classes such as worker users and/or employer users.

Satellite communications network 240 could communicate with satellite signal receiver 242 which receives data signals from satellite 244 which in turn is in remote communication with satellite signal transmitter 246. Terminals, for example further processing system 248, notebook computer 250, or satellite telephone 252, can thereby communicate with network 202. A local network 260, which for example may be a private network, LAN, etc., may also be connected to network 202. For example, network 202 may relate to ethernet 262 which connects terminals 264, server 266 which controls the transfer of data to and/or from database 268, and printer 270. Various other types of networks could be utilized.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, ethernet, token ring, FDDI ring, star, etc., networks, or mobile telephone networks, such as GSM, CDMA, 3G, 4G, etc., networks, and may be wholly or partially wired, including for example optical fiber, or wireless networks, depending on a particular implementation.

Figure 3:
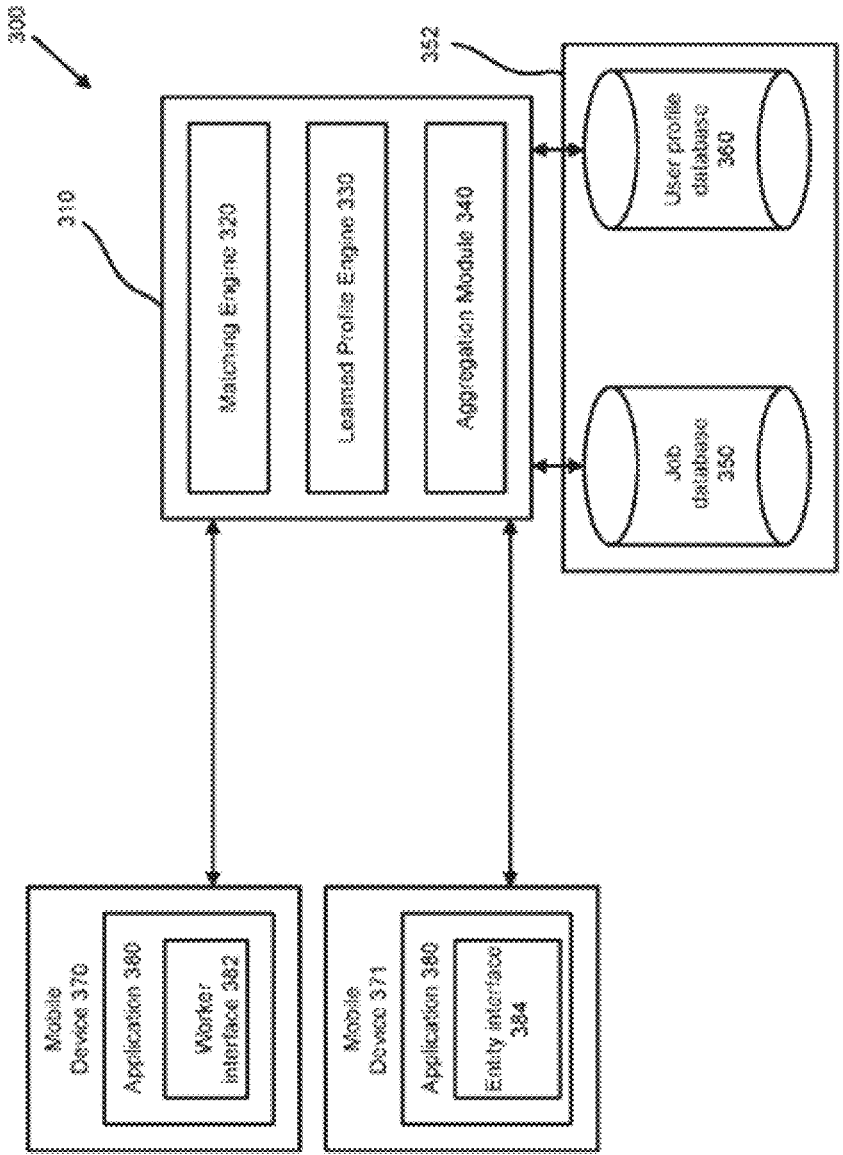
FIG. 3 illustrates a system diagram of a system for matching workers to entities which define jobs.

FIG. 3 illustrates a system diagram of a system 300 for matching workers to entities which define jobs. In particular, the system 300 includes a server processing system 310 in data communication with a first and second mobile device 370, 371, preferably smart phones, or tablet processing systems, etc., via a one or more communication networks.

The first mobile device 370 is operated by a worker and the second mobile device 371 is operated by an entity. It will be appreciated that the system 310 can include a plurality of first and second mobile devices 370, 371 operated by a respective plurality of workers and entities. The server processing system 310 may access or include a data store 352 including a user profile database 360 and a job database 350.

It will be appreciated that user profile database 360 and job database 350 can be hosted by the server processing system 310; however, it is equally possible that the user profile database 360 and the job database 350 are hosted by other database serving processing systems. Processing system 100 is suitable for operation as the server processing system 310. The server processing system 310 includes a matching engine 320, a learned profile engine 330, and an aggregation module 340 which will be discussed in more detail in various examples below.

The user profile database 360 includes profiles for both workers (associates) and employers (clients). When an employer user has a service request (may be referred to as any of "job," "shift," or "gig") the employer user makes use of the platform to select a job template that most closely matches the service request that they have and provides the requisite time period the service request is associated with. Each job template includes a number of requisites (skills/certifications) for worker users to match to the job. The employer may add additional criteria to the service request in addition to the template (e.g., drug tests, average worker rating, etc.). Worker users whom match the service request may sign up for the shift and work that service request.

The matching engine 320 may match workers to job requests on an absolute or percentage basis. Where a percentage basis is implemented, a threshold percentage is considered a match. A near-miss match may be established via an absolute basis or percentage. Where a percentage basis is implemented, near-miss matches similarly use a threshold percentage, but lower than the threshold percentage for matches.

The mobile devices 370, 371 include a processor, a memory, an input and output device preferably provided in the form of a touch screen interface, and a communication device. Preferably, the mobile device. 370, 371 includes a location receiver (such as a Global Positioning System location receiver) 375. Preferably, the mobile devices 370, 371 have stored in the memory a mobile device application 380 which can be downloaded by the mobile devices 370, 371 from a software repository processing system. The user can register with the server processing system 310 as a worker or an entity. If the user registers as a worker, a worker interface 382 will be presented via the mobile application 380 via their respective mobile device 370. If the user registers as an entity, an entity interface 384 will be presented via the mobile application 380 via their respective mobile device 371. However, it will be appreciated that two separate mobile applications could be provided for the two different types of users in alternate arrangements.

Provisional Recommendations

Worker users are shown a view (e.g., a map view) of available and provisional (near-miss) jobs matched on percentage of compatibility characteristics between the associates' qualifications and preferences and the employer user service needs and preferences. Worker user qualifications and preferences will include but not be limited to skills, industry, type of work, location, environment, assignment length, potential earnings. Map view of jobs is filterable based on worker user preferences to include closest physical placement branch office. Worker users have the opportunity to earn badges through work quality and tenure that will allow them to see more highly valued jobs. The same factors used to show worker users matching jobs are used on employer user side to show matching workers.

Figure 4:
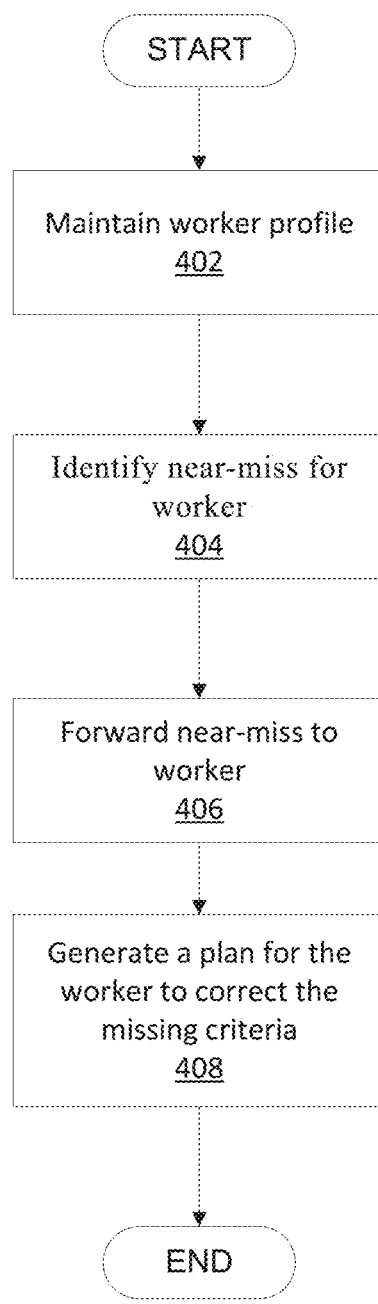
FIG. 4 is a flowchart illustrating a method of provisionally matching workers to job with near-miss requirements.

FIG. 4 is a flowchart illustrating a method of provisionally matching workers to job with near-miss requirements. In step 402, the system maintains a worker profile. The worker profile may be a new profile, or a pre-existing profile. Maintaining the profile includes a continuous, objective characterization of the workers' experience (previous gigs worked, experience external to the system), preferences (e.g., hours availability, distance of willing travel, location, or other suitable worker preferences), certifications, and previous reviews by employers (e.g., employers within the gig system providing post-gig reviews of a worker).

A worker's experience that occurs while operating within the system is tagged with a number of skills associated with each gig worked (e.g., use of machinery, customer service, construction, hospitality skills, etc.). In some embodiments, the available jobs/gigs in the system have predetermined characteristics. When the job is listed on the system, the details of the job come from a template. The template includes the metadata tags indicating the skills involved. In some embodiments, the templates are modified or are flexible such that the listing employer may request specific additional skills or indicate that certain skills will be used during the gig.

The tags associated with a given position are kept honest within the system at least based on worker feedback. Where more skills are required by the employer for a gig, the gig worker (and the placement system) may be paid more. Where the worker accepts and works a job that was miss-tagged, that worker may lodge a notice with the system indicating the discrepancy.

Worker experience is tallied based on each gig worked. Each time a given skill tag is associated with a gig a given worker works, the worker's tracked "proficiency" for that skill/tag increases within the system. In some job postings, a predetermined or selected proficiency is required by the entity listing the position. After obtaining a predetermined amount of experience in a given skill, the worker profile may have a public badge indicating progression in a given skill level (e.g., apprentice, journeyman, master). The badges may be used as requirements or engender confidence in employer users.

Embodiments of reviews by past employers include star rankings, and/or short text reviews. In some embodiments, maintenance of a worker profile includes natural language processing (NLP) of the text reviews. The NLP process identifies common phrases and/or words used in reviews to perform sentiment analysis. In some embodiments, positive or negative reviews may affect a worker profile's proficiency statistics.

Generally speaking, there is a direct correlation between the number of requirements for a job listing and the wage/cost of a worker to fill the job. Simple economic incentive encourages workers to accrue more skills or better statistics in their maintained profiles.

In step 404, the system compares worker profiles to available positions to identify near-misses. In many cases, workers are matched to positions and the workers are enabled to work those positions and develop additional skills. In some circumstances, the system identifies near-misses. Near-misses do not necessarily evaluate each criteria of a match evenly. Some criteria may be harder to change. For example, if a worker has a negative rating from the employer of a given listing, but perfectly matches on every other criterion, that worker may still not be a "near-miss" because the negative rating is given greater weight that other criteria. Depending on embodiment, each criterion maintained on a worker's profile may be weighted differently with respect to whether a position is considered a near-miss. In some embodiments, matches are evaluated on a percentage basis, and near-miss matches require a lower threshold percentage matching than a job match.

Where a former employer's rating may prevent a worker from matching or near-miss matching, in some embodiments, there are intermediary behavioral status indicators. Examples include use of NLP evaluations of text reviews of a worker to extract and identify behavioral issues with a worker (e.g., the worker is perennially late). A near-miss may be based on the worker not meeting a behavioral requirement as verified by NLP analysis of text reviews of worker performance.

In some embodiments, high skill in one skill tag may translate to lower skill in another tag, and the skill translation may be used to establish a near-miss match. For example, if the worker has experience working in manufacturing on a production line, they may be capable of working in a warehouse to pick and pack product. Example objective criteria for establishing a near-miss may include worker profile matches to available job positions that include all necessary requirements except:

A. A certification (including employer specific requirements)
 B. A required skill, while having a transferable skill
 C. Sufficient proficiency in a required skill, while having at least a threshold proficiency in the skill relative to the requirement (e.g., based on required proficiency, the threshold amount may still be zero)
 D. Willingness to travel as far as necessary, while still willing to travel a threshold distance relative to the requirement (e.g., based on required distance, the threshold amount may be de minimus)
 E. Hours of availability
 F. Meet a behavioral rating
 G. Drug Tests
 H. Background Checks In step 406, the system forwards near-miss matches to the workers based on a search rank. Provisional recommendations for jobs are most useful to potential workers when developing toward those provisional positions is an improvement over a status quo for that worker. In some embodiments, the near-miss positions are presented to the workers sorted/ranked by available wages as compared to past wages earned by each worker.

In some embodiments, for each near-miss position matched to a worker, the posted wages for that near-miss position are compared to an average that worker has earned across other positions they have accepted/worked. In some embodiments, each near-miss position is compared to the highest wage earned by that worker from other positions. Other criteria may be further be applied to refine near-miss results. For example, the wages from the worker's previous positions may be limited by removing outliers, or by only using data from a recent period of time (last week, last month, last quarter, last year, etc.).

Each forwarded near-miss position includes a reference to the criterion that the individual worker is missing. In some embodiments, the display including near-miss positions is on a different screen/"pane-of-glass" than where proper matches are displayed.

In step 408, in response to a worker user selecting a near-miss position, the system generates a plan for the worker to correct the missing criteria in order to shift the near-miss into a match. The plan to correct is based on a style and/or magnitude of the missing criteria. In some circumstances, the plan may require only that the worker update their preferences. In other circumstances, the plan may require that the worker sign up/work a particular set of gigs (that may be sub-optimal) to develop requisite skill proficiency/experience. In still other circumstances, the plan may include information regarding the process required to obtain a requisite certification.

Where the missing criterion is behaviorally related, the plan may be connected to working other gigs to an extent that reviews of previous gigs are overwritten/pushed out by new reviews. Text reviews (for purposes of behavioral evaluation) may expire or be overwritten over time. The system may further engage an observational program that monitors the worker's location and provides reminders as to when the worker should leave home to arrive on time, include friendly reminders concerning how the worker should address peers and supervisors (e.g., reminders about shaking hands, eye contact, not smoking on the job), how they should dress, reminders on what equipment (e.g., personal protective equipment) they should arrive with, and where they can obtain the necessary equipment. In some embodiments, a more general set of reminders related to an accepted position are delivered to users regardless of whether their reviews have referenced behavioral issues. In some embodiments, the reminders that are delivered to worker users with identified behavioral issues are tailored specifically to the behavior issues that were identified via NLP of text reviews.

Figure 5:
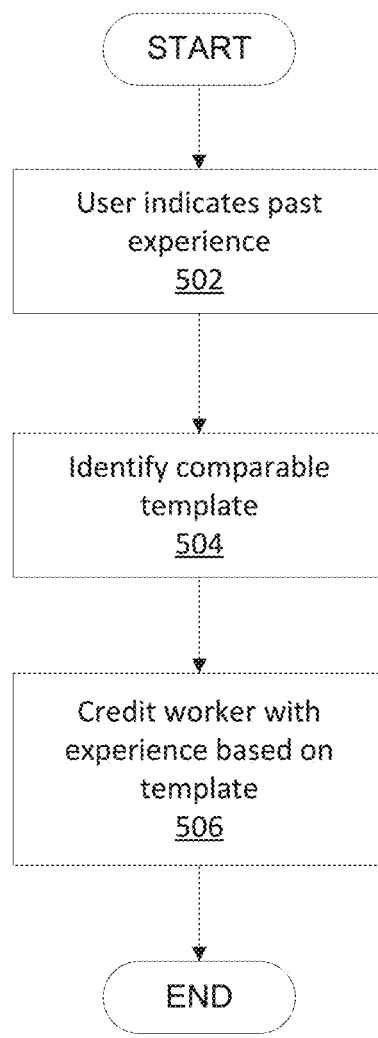
FIG. 5 is a flowchart illustrating a verification of skills. Users may have different skills ratings for different types of work.

FIG. 5 is a flowchart illustrating a verification of skills. Users may have different skills ratings for different types of work, and some experience comes from outside of service requests/gigs/shifts that are recorded on the platform. In step 502, when a worker user is initially onboarded to the platform, the user indicates their past experience. In step 504, the platform identifies a most-comparable template position (including skill tags). The identification may be performed via an in-person human decision, or via a machine learning model and/or a heuristic-based model. When performed by a machine learning model, a training set of data comprises descriptions of various jobs, and then subsequently forced into one of the available templates. When a new job description is received by a user, the model similarly forces the new description into one of the platform job templates. Heuristics operate similarly to the machine learning model but make use of the presence of keywords in the present job description in order to associate with a template.

In step 506, the platform credits the worker user with a corresponding amount of skill in each of the skill tags associated with the template based on the length of time the worker user held the described position.

Figure 6:
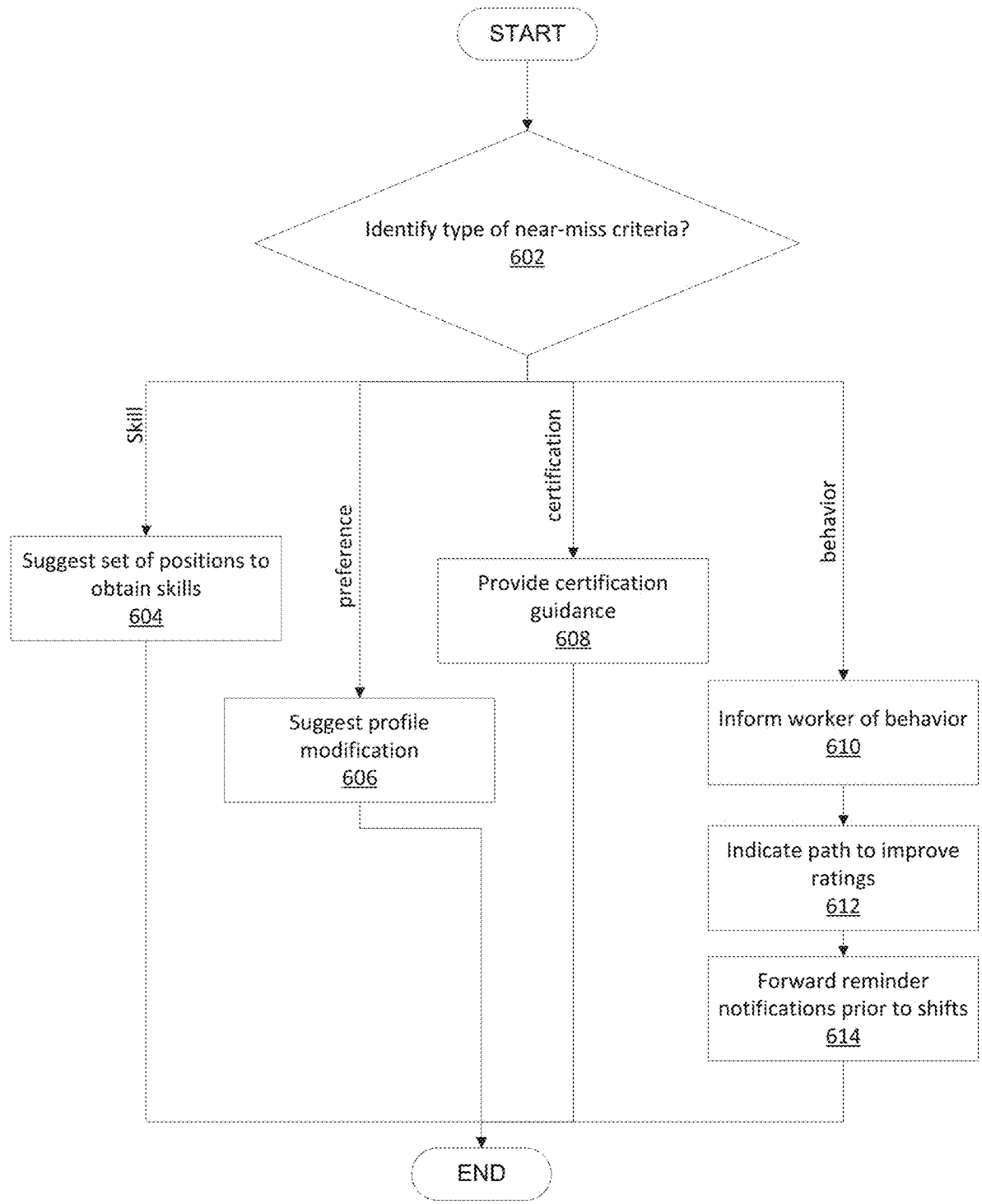
FIG. 6 is a flow chart illustrating a process of indicating avenues to qualify for provisional matches.

FIG. 6 is a flow chart illustrating a process of indicating avenues to qualify for provisional matches. In step 602, the platform identifies a near-miss criteria for a worker compared to a particular job/service need. The type is identified based on a field from which the criteria is found in the worker user's profile. The type of near-miss criteria affects the following actions that are taken by the platform. A number of example categories that the near-miss criteria may fall into include: skill-based, preference-based, certification-based, or behavior-based.

In step 604, where the near-miss criterion is skill-based, the platform suggests a set of positions that the worker user could sign up for that would develop the skills the worker would need to shift the near-miss into a match. In some embodiments, the necessary path may not be available on the platform, and additional notifications are delivered to the user over a period of time as shifts become available to obtain the necessary work experience. Examples include agreeing to take on gigs for reduced or no pay. The platform graphic user interface for the worker includes controls for the worker to make concessions in order to incentivize an employer user to accept the worker user on the gig.

In step 606, where the near-miss criterion is preference-based, the platform suggests that the worker user go into their profile and make modifications that resolve the issue.

In step 608, where the near-miss criterion is certification-based, the platform either connects the worker user to an agent to provide guidance on where the worker may obtain the necessary certification or provides a weblink to a written guide.

In step 610, where the near-miss criterion is behavior-based, the platform first informs the user of the behavior issue (e.g., the worker is notified that they were found to be unreliable, or canceled shifts too frequently or without enough notice, or have received poor ratings). In step 612, the platform indicates to the worker user a path to improve their ratings by working less restrictive positions and achieving at least threshold ratings until their overall rating has improved. In step 614, the platform delivers reminders regarding behavior to the worker user prior to their accepted gigs.

Figure 7:
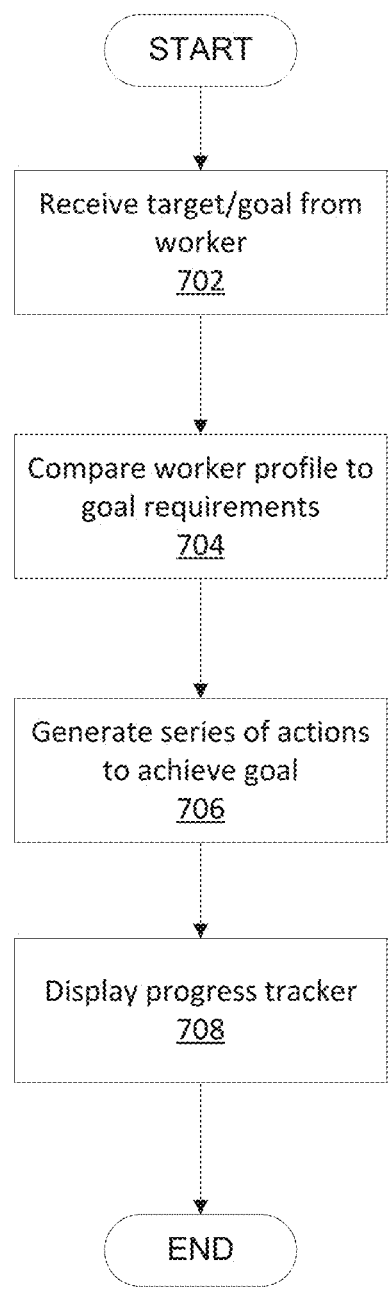
FIG. 7 is a flowchart illustrating generation of a potential career path developmental plan.

FIG. 7 is a flowchart illustrating generation of a potential career path developmental plan. A near-miss match is a single step in development. However, the platform additionally develops plans for worker users that occur over multiple steps. In step 702, the worker user sets a goal. The goal is a selected position/gig that they do not qualify for. The goal may be a currently pending service request that the worker does not match with, or may correspond to a template (e.g., a theoretical position that an employer user may request in the future).

In step 704, the platform compares the worker user's profile to the requirements of the target. In step 706, the platform generates a series of actions, that if taken, would enable the target to be a match for the worker. The series includes a number of (lesser) positions/gigs that the worker user may sign up for in order to develop the required skills and at the required proficiency in those skills.

In step 708, the platform generates and delivers a graphic user interface that keeps track of the worker user's progress toward the goal. The user interface may display development with graphs or numerical statistics. The tracked progress is gamified in the sense that worker users are encouraged by seeing a graphical representation of the progress toward their goal.

Automated Resume Builder

Figure 8:
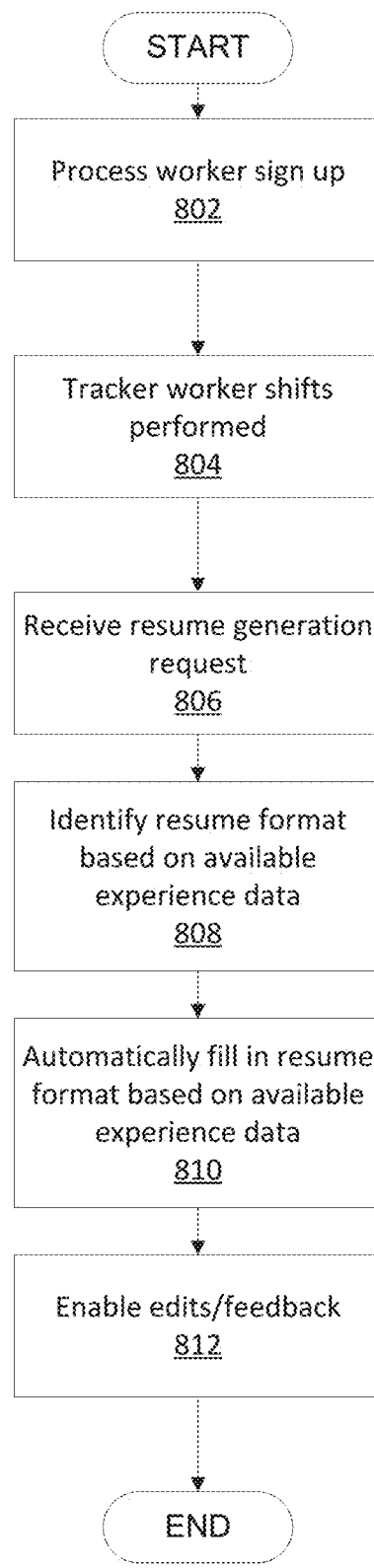
FIG. 8 is a flowchart illustrating a process of automatically generating a resume for workers on the temporary employment platform.

FIG. 8 is a flowchart illustrating a process of automatically generating a resume for workers on the temporary employment platform. The temporary employment platform keeps track of jobs worked by any given individual, and thus has all the necessary information to develop a resume automatically for the user. Other automated resume builder applications involve full entry of all relevant details and merely provide formatting services.

In step 802, a worker signs up for the temporary employment platform. Relevant personal information is given to the platform in order to establish payroll and other known employment particulars.

In step 804, the worker user engages with the employment platform and works temporary gigs/shifts for various available positions. The platform keeps track of each gig worked, and the relevant skills tagged from those gigs (via templates or modified templates for the positioned the worker filled).

In step 806, the platform receives a request to generate a resume. In step 808, the platform assembles all positions the worker has performed in, and skills that the worker has and identifies a resume format. The format of the resume is based on the worker's profile within the platform. The resume format/template is automatically determined by the platform based on the worker's experience, skills, employer reviews, and certifications. Where a given worker has taken many positions, with many different employers (as measured by threshold values), the resume formats to focus on the skills the worker has as opposed to individual employment. Where a worker has a specialized skill (e.g., welding), the resume format is tailored toward employment that is related to that skill and deemphasizes unrelated employment (e.g., where the worker is a welder, gigs as catering staff are not particularly relevant).

Where a given worker has taken many (as measured by thresholds) shifts repeatedly with a given employer user, the resume format focuses on the worker's relationship with the given employer. In some embodiments, if the worker user has numerous positive text reviews or score-based reviews, the resume format focuses on the worker's references and reviews. Positive text reviews are identified via a sentiment analysis engine and semantic construction engine. Sentiment analysis identifies keywords that indicate sentiment, and automatic semantic analysis attaches that sentiment to specific actions, skills, or performance related attributes. Based on the automated analysis, the system procedurally generates resume content (e.g., descriptions of skills or attributes). Score-based reviews may easily translate into highlighted candidate attributes on a resume (e.g., via a hierarchy of attributes and threshold scores that translate into procedurally generated resume attributes).

The platform includes multiple formats that focus on emphasizing the best parts of the user's profile or target industries. Additional format templates can be added to the platform based on evolving styles in various industries.

In some embodiments, template styles are identified via machine learning models rather than heuristic guidelines (described above). To train the model, a large plurality of resumes may be input into the system, and the model interprets what appears on those resumes and correlates content of resume (e.g., experiences, skills) to structure (e.g., how the resume is written). The interpretation is performed via NLP. The machine learning model uses the user's profile as compared to the data structures based on the training data to identify what elements of the user's profile are the most relevant.

Similarly, the model may identify what information tends to not appear together and filter lower incidence data out (e.g., when a worker has multiple references to experience performing skilled labor tasks, then experience at unskilled labor will tend not to appear on the same resume). In the example, the "lower incidence" data is the experience relating to unskilled work; however, the lower incidence varies based on the training data in the machine learning model. The relevant work data that is filtered out is based on the resume content that tends to appear together across the training set. The population of the training set may be configured to be biased toward particular traits (e.g., skilled work) by including more instances of skilled work resumes than non-skilled work.

In some embodiments, especially some embodiments relying upon a machine learning model, a specific template format is not used. Rather, the machine learning model identifies a path in an artificial neural network where the generated resume content adheres to certain traits or rules that are template-like in nature according to that path of the neural network.

In step 810, the platform automatically fills in fields/page space of the resume template identified in step 808. Details used to fill in the template fields favor more recent employment, or employment with strongest employer reviews (as identified via NLP sentiment analysis). Embodiments of reviews by past employers include star rankings, and/or short text reviews. In some embodiments, maintenance of a worker profile includes NLP of the text reviews. The NLP process identifies common phrases and/or words used in reviews to perform sentiment analysis. In some embodiments, positive or negative reviews may affect a worker profile's proficiency statistics.

In some embodiments, resume content may be generated via the machine learning model constructed using a plurality of resumes as training data. Notably, sufficiency as training data requires a significant number of examples. Two resumes alone do not sufficiency constitute training data. In many cases, the amount of examples comprising the training data correlates to the accuracy of the model. Having a greater number of example resumes in the training data will lead to more realistic looking model generated resume content. However, at some point additional examples in the training data have diminishing returns with respect to model accuracy.

In some embodiments, resume content is generated via procedural rules and predefined template structures.

In step 812, the user is provided the opportunity to make direct edits, and/or provide feedback to the platform. In some embodiments, new or modified resume templates are constructed based on user feedback evaluated by a machine learning model.

Gamification of Temporary Employment Platform

Gamification of the platform refers to providing additional incentives (beyond wages) to encourage behavior on the platform. The behavior encouraged may be both performance in gigs, as well as actions that aid operation of the platform itself. Performing certain encouraged behavior earns a user badges or merits. The badges earn administrative privileges within the system or non-monetary prizes. Examples of the incentivized behavior include:

A. Having worked gigs on X consecutive days. Where X varies in magnitude and the number of style of badges earned directly corresponds to the magnitude.

B. Earning X consecutive high (e.g., 5/5 star) ratings from employer users.

C. Referring X reliable (e.g., average of 3/5+ star ratings after a predetermined threshold number of gigs worked) worker users to the system.

D. Maintaining a minimum predetermined rating across multiple employer users over a predetermined timeframe.

E. Achieving a predetermined progression in a given skill (e.g., apprentice, journeyman, master).

F. Showing up on time to X consecutive gigs as promised (as evaluated by location data from a GPS on a mobile device associated with the user as compared to a geofence placed around the location of the gig at the time of the gig).

Instances of X vary in magnitude and the number of style of badges earned directly corresponds to that magnitude.

Figure 9:
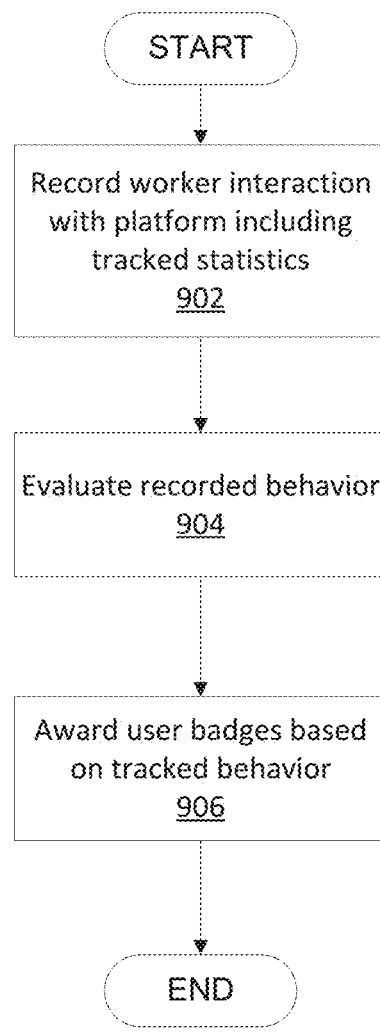
FIG. 9 is a flowchart illustrating a process of gamification of platform engagement.

FIG. 9 is a flowchart illustrating a process of gamification of platform engagement. In step 902, a worker user interacts with the platform. Interaction with the platform is qualified as any activity the platform tracks or keeps statistics on. Examples of tracked statistics include: events affecting associate reliability/rating (permissionable), work/payment history (filterable, totalable), relationship management (lifetime hours, most recent customers, match xx % jobs), birthday/anniversary, current assignments, job tickets, job matching, profile updates, view jobs history/decline job history, call off history, no show history, preferences, status updates (available/not available), and % match to current job.

In step 904, the platform evaluates recorded behavior for candidacy for badges.

In step 906, the platform awards a user badges to the user profile based on the tracked behavior. In some embodiments, badges are publicly visible on a workers' profile. Badges enable a worker user to have additional permissions in the platform or are exchangeable for rewards (e.g., credit toward goods or services).

Badges may be of different types. The types break into separate categories. First, what type of incentive is included, and second, the degree of expendability of the badge. A given badge may have any combination of available incentives, but only a single degree of expendability. The types of incentive are privilege related, and reward related (e.g., credit toward goods or services). The degrees of expendability are permanent, temporary, or fungible. A permanent badge is one that once earned is held forever. A temporary badge is one that exists for a predetermined period or as long as the worker user satisfies badge requirements, and fungible is a badge that is spent to obtain a reward. In some embodiments, the application badges are displayed to users via the graphic user interface with graphic icons.

Example rewards include gifts such as pre-paid vacations, electronics, fruit baskets, etc. Example administrative privileges include the ability to invite other, un-verified workers to a given gig (if there is availability for that gig). Another administrative privilege is the ability to un-publish employer reviews (an un-published review is removed from the worker's profile for purposes other than those connected to the reviewer themselves). A third example of an administrative privilege is the degree to which a worker is able to engage with the platform and review employers.

In circumstances where the worker user receives an administrative privilege as an incentive, issuance of the privilege is automatic. The user's graphic user interface changes to include additional controls. In some embodiments, the user is informed of the change via a notification.

Figure 10:
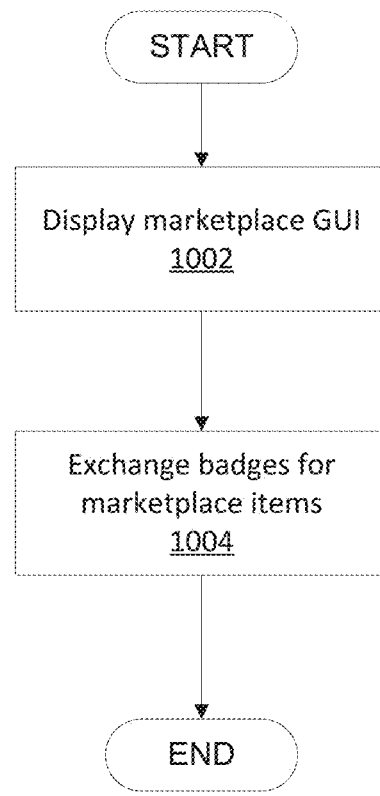
FIG. 10 is a flowchart illustrating issuance of gamified rewards related to badges.

The modification of the graphic user interface may include the inclusion of a new button. When changes to the number or type of badges occur (either addition or subtraction of badges) the application reevaluates which application functions the current user has available. In response to that evaluation the application badges the GUI is modified to include a previously unincluded control that activates the application function that was newly added (or revoked) to the user account based on the badges.

activating an application function of the application, via a the previously unincluded control included in the graphic user interface, for the first user FIG. 10 is a flowchart illustrating issuance of gamified rewards related to badges. In step 1002, a worker user enters a marketplace user interface. In step 1004, the user selects items and exchanges badges for rewards.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps (or employ systems having blocks) in a different order, and some processes or blocks may be deleted, moved, added, subdivided, combined, and/or modified to provide sub- or alternative combinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples; alternative implementations may employ differing values or ranges.

The teachings of the disclosure provided herein can be applied to other systems, not necessarily the system described above. The elements and acts of the various embodiments described above can be combined to provide further embodiments.

All patents, applications, and references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for.") Accordingly, the applicant reserves the right to add additional claims after filing the application to pursue such additional claim forms for other aspects of the disclosure.

What is claimed is:

1. A method of guiding an application userbase through application use comprising:
   executing an application that matches users to based on a set of requirements associated with each task and respective user profiles;
   identifying a near-miss task associated with a first user, wherein the near-miss task is a task that does not match the first user but would match but for a missing user profile criterion;
   comparing, by the application based on monitoring the first user, a first metric indicative of the missing user profile criterion of the first user to a second metric indicative of the missing user profile criterion, the second metric being stored in a worker performance database;
   automatically determining, by the application based on the comparing, whether remedying the second metric causes the near-miss task to match for the first user;
   displaying the near-miss task and the missing user profile criterion to the first user via an instance of the application executing on a user device; and
   displaying, based on the determining, one or more recommendations that enable the near-miss task to match for the first user.

2. The method of claim 1, further comprising:
   identifying a type of the missing user profile criterion based on a field from which the missing user profile criterion is found in a user profile of the first user; and
   generating a development plan based on the type of the missing user profile criterion, wherein the development plan describes a list of actions the first user may take to cause the near- miss task to become a match for the first user.

3. The method of claim 2, wherein the type of the missing user profile criterion may be any of:
   skill based;
   preference based;
   certification based; or
   behavioral.

4. The method of claim 2, wherein the type is preference-based, the method further comprising:
   transmitting a message to the first user to modify preferences in the user profile of the first user.

5. The method of claim 2, wherein the type is skill-based and the development plan includes a list of tasks that, once performed, qualifies the near-miss task to match for the first user.

6. The method of claim 2, wherein the type is certification-based and the development plan includes instructions describing how to obtain a necessary certification that qualifies the near-miss task to match for the first user.

7. The method of claim 2, wherein the type is behavioral and the development plan includes instructions describing a set of user ratings the first user requires while performing other tasks that qualifies the near-miss task to match for the first user.

8. The method of claim 1, further comprising:
   tracking tasks completed by the first user, wherein each task is associated with a set of tracked skills, and wherein completion of each task increases a counter for each tracked skill associated with a respective completed task; and
   reevaluating matches based on increases in the counter for each tracked skill.

9. A system of guiding an application userbase through application use comprising:
   an application server including a memory including instructions that cause the application server to host an application that matches users to tasks based on a set of requirements associated with each task and respective user profiles;
   wherein the memory further includes instructions to identify a near-miss task associated with a first user, wherein the near-miss task is a task that does not match the first user but would match but for a missing user profile criterion; and
   a client application configured to execute on a user device and display the near-miss task and the missing user profile criterion to the first user via an instance of the application executing on the user device,
   wherein the application server is further caused to:
      compare, by the application based on monitoring the first user, a first metric indicative of the missing user profile criterion of the first user to a second metric indicative of the missing user profile criterion, the second metric being stored in a worker performance database;
      automatically determine, by the application based on the comparing, whether remedying the second metric causes the near-miss task to match for the first user;
      display the near-miss task and the missing user profile criterion to the first user via the instance of the application executing on the user device; and
      display, based on the determining, one or more recommendations that enables the near- miss task to match for the first user.

10. The system of claim 9, wherein the memory further includes instructions to:
   identify a type of the missing user profile criterion based on a field from which the missing user profile criterion is found in a user profile of the first user; and
   generate a development plan based on the type of the missing user profile criterion, wherein the development plan describes a list of actions the first user may take to cause the near-miss task to become a match for the first user.

11. The system of claim 10, wherein the type of the missing user profile criterion may be any of:
   skill based;
   preference based;
   certification based; or
   behavioral.

12. The system of claim 10, wherein the type is preference-based and the memory further includes instructions to:
   transmit a message to the first user via the client application to modify preferences in the user profile of the first user.

13. The system of claim 10, wherein the type is skill-based and the development plan includes a list of tasks that, once performed, qualifies the near-miss task to match for the first user.

14. The system of claim 10, wherein the type is certification-based and the development plan includes instructions describing how to obtain a necessary certification that qualifies the near-miss task to match for the first user.

15. The system of claim 10, wherein the type is behavioral and the development plan includes instructions describing a set of user ratings the first user requires while performing other tasks that qualifies the near-miss task to match for the first user.

16. The system of claim 9, wherein the memory further includes instructions to:
   track tasks completed by the first user, wherein each task is associated with a set of tracked skills, and wherein completion of each task increases a counter for each tracked skill associated with a respective completed task; and
   reevaluate matches based on increases in the counter for each tracked skill.

17. A method comprising:
   executing an application that matches users to tasks based on a set of requirements associated with each task and respective user profiles, the tasks categorized based on work experience associated therewith, the respective user profiles including a first tracked experience type;
   identifying a near-miss task associated with a first user, wherein the near-miss task is a task that does not match the first user but would match but for the first user having less experience in the first tracked experience type than described in the set of requirements of that task, and wherein the near-miss task includes a criterion from a user profile of the first user that, when modified, causes the near-miss task to become a match for the first user;
   identifying a set of tasks that are categorized into work experience of the first tracked experience type;
   in response to completion of the set of tasks by the first user, raising the first tracked experience type of the first user to meet a described amount of experience in the first tracked experience type described in the set of requirements of the near-miss task;
   displaying the near-miss task and the set of tasks to the first user via an instance of the application executing on a user device; and
   displaying, based on the raising, one or more recommendations that enable the near-miss task to match for the first user.

18. The method of claim 17, wherein the user profile of the first user indicates an amount of the first tracked experience type, and the amount is above a minimum threshold defined in the set of requirements of the near-miss task.

19. The method of claim 17, wherein said displaying the set of tasks occurs over a series of notifications as tasks become available on the application.

20. The method of claim 17, wherein the set of tasks includes at least one scheduled task and at least one unscheduled task.

* * * * *